(12) United States Patent
Strong

(10) Patent No.: US 11,150,069 B1
(45) Date of Patent: Oct. 19, 2021

(54) COMBINED SQUARE LEVELING

(71) Applicant: John Strong, Lafayette, IN (US)

(72) Inventor: John Strong, Lafayette, IN (US)

( * ) Notice: Subject to any disclaimer, the term of this patent is extended or adjusted under 35 U.S.C. 154(b) by 0 days.

(21) Appl. No.: 16/838,528

(22) Filed: Apr. 2, 2020

(51) Int. Cl.
*G01B 3/1092* (2020.01)
*G01B 3/1041* (2020.01)
*G01C 9/06* (2006.01)
*G01C 1/00* (2006.01)
*G01C 9/36* (2006.01)

(52) U.S. Cl.
CPC ......... *G01B 3/1092* (2020.01); *G01B 3/1041* (2013.01); *G01C 1/00* (2013.01); *G01C 9/06* (2013.01); *G01C 9/36* (2013.01); *G01C 2009/066* (2013.01)

(58) Field of Classification Search
CPC ...... G01B 3/1092; G01B 3/1041; G01C 9/36; G01C 1/00; G01C 9/06; G01C 2009/066
USPC .......................................................... 33/760
See application file for complete search history.

(56) References Cited

U.S. PATENT DOCUMENTS

| | | | |
|---|---|---|---|
| 4,700,489 A | 10/1987 | Vasile | |
| 5,727,325 A * | 3/1998 | Mussell | B43L 7/027 |
| | | | 33/429 |
| 5,894,675 A * | 4/1999 | Cericola | G01B 3/00 |
| | | | 33/451 |
| D428,348 S | 7/2000 | Hatfield | |
| 6,230,416 B1 * | 5/2001 | Trigilio | B43L 7/027 |
| | | | 33/451 |
| 6,338,204 B1 | 1/2002 | Howle | |
| 6,578,274 B1 * | 6/2003 | Tango, Jr. | B44D 3/38 |
| | | | 33/1 G |
| 7,389,593 B2 * | 6/2008 | Perazio | G01C 15/02 |
| | | | 33/414 |
| 7,600,326 B2 * | 10/2009 | Plucknett | G01B 3/1084 |
| | | | 33/760 |
| 8,898,921 B1 | 12/2014 | Adorno | |
| 9,488,458 B2 * | 11/2016 | Phillips | G01B 3/1084 |
| 9,546,867 B2 | 1/2017 | Lueck | |
| 2004/0172839 A1 * | 9/2004 | Zirk | B43L 7/005 |
| | | | 33/451 |
| 2004/0172846 A1 * | 9/2004 | McRae | G01B 3/1041 |
| | | | 33/760 |
| 2005/0034320 A1 * | 2/2005 | Connor | G01C 9/26 |
| | | | 33/760 |
| 2009/0056159 A1 * | 3/2009 | Plucknett | G01B 3/1084 |
| | | | 33/760 |
| 2010/0115781 A1 * | 5/2010 | Norelli | G01C 9/28 |
| | | | 33/371 |
| 2011/0138642 A1 * | 6/2011 | Norelli | G01C 9/28 |
| | | | 33/371 |
| 2012/0036727 A1 * | 2/2012 | McCarthy | B43L 23/00 |
| | | | 33/760 |

(Continued)

*Primary Examiner* — Yaritza Guadalupe-McCall

(57) ABSTRACT

A combined square leveling for combing multiple construction tools into a single device includes a framer's square for measuring angles during construction. A tape measure is retractably positioned within the framer's square and the tape measure is urgeable outwardly from the framer's square for measuring distance. The tape measure is biased to retract into the framer's square. A bubble level is coupled to the framer's square to determine if a surface is level. A laser level is slidably coupled to the framer's square to emit a beam of light to establish a reference point on a distal object.

7 Claims, 5 Drawing Sheets

(56) References Cited

U.S. PATENT DOCUMENTS

2012/0240419 A1\* 9/2012 Wagner ................ G01B 3/563
33/275 R

\* cited by examiner

US 11,150,069 B1

COMBINED SQUARE LEVELING

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to combined tools and more particularly pertains to a new combined tool for combining multiple construction tools into a single device.

(2) Description of Related Art Including Information Disclosed Under 37 CFR 1.97 and 1.98

The prior art relates to combined tools including a combination tool that includes a framer's square and a tape measure. Additionally, the prior art discloses a variety of combination tools, all disclosing a variety of combinations of tape measures, framing squares, levels and stud locators. None of the prior art discloses a framing square that includes a laser level that has lateral adjustment.

BRIEF SUMMARY OF THE INVENTION

An embodiment of the disclosure meets the needs presented above by generally comprising a framer's square for measuring angles during construction. A tape measure is retractably positioned within the framer's square and the tape measure is urgeable outwardly from the framer's square for measuring distance. The tape measure is biased to retract into the framer's square. A bubble level is coupled to the framer's square to determine if a surface is level. A laser level is slidably coupled to the framer's square to emit a beam of light to establish a reference point on a distal object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
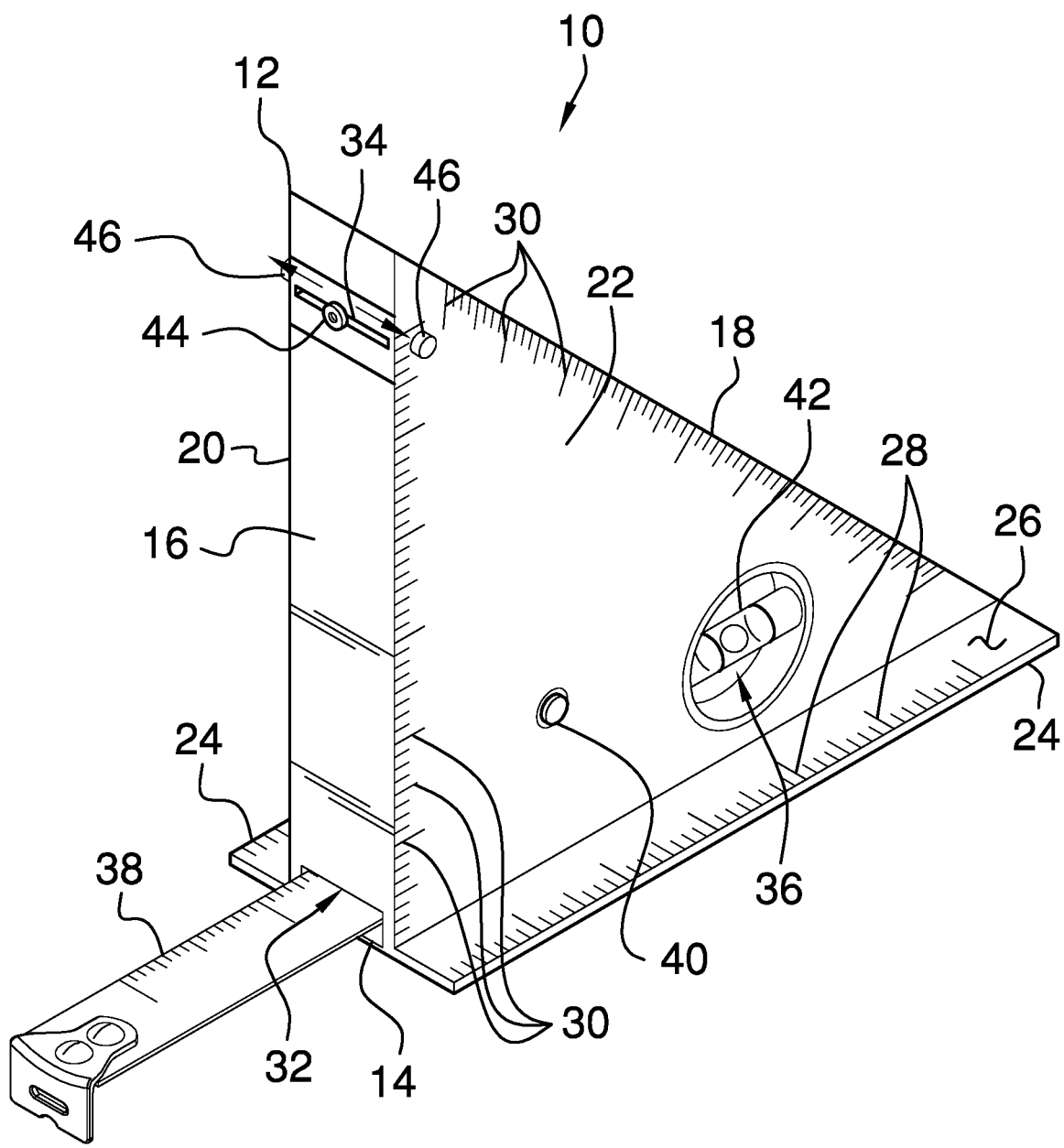
FIG. 1 is a perspective view of a combined square leveling according to an embodiment of the disclosure.
Figure 2:
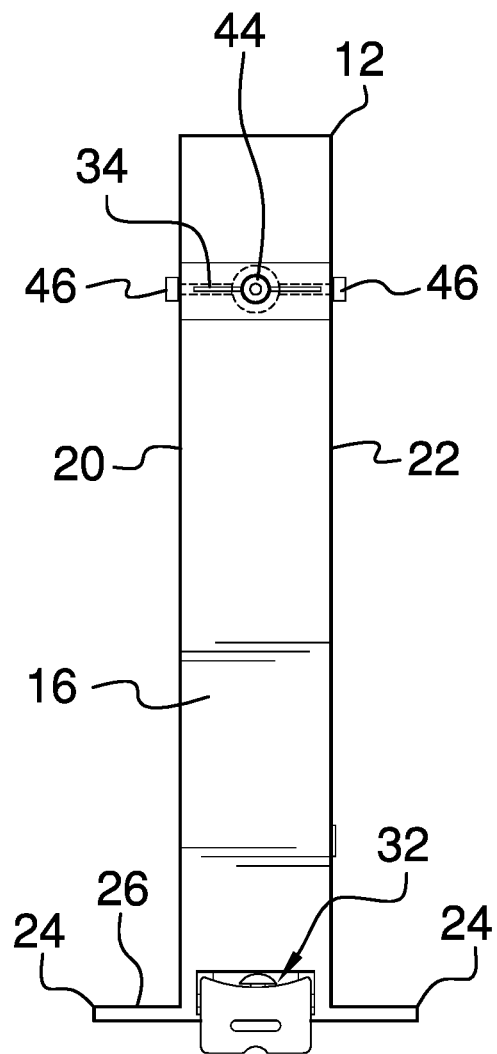
FIG. 2 is a front view of an embodiment of the disclosure.
Figure 3:
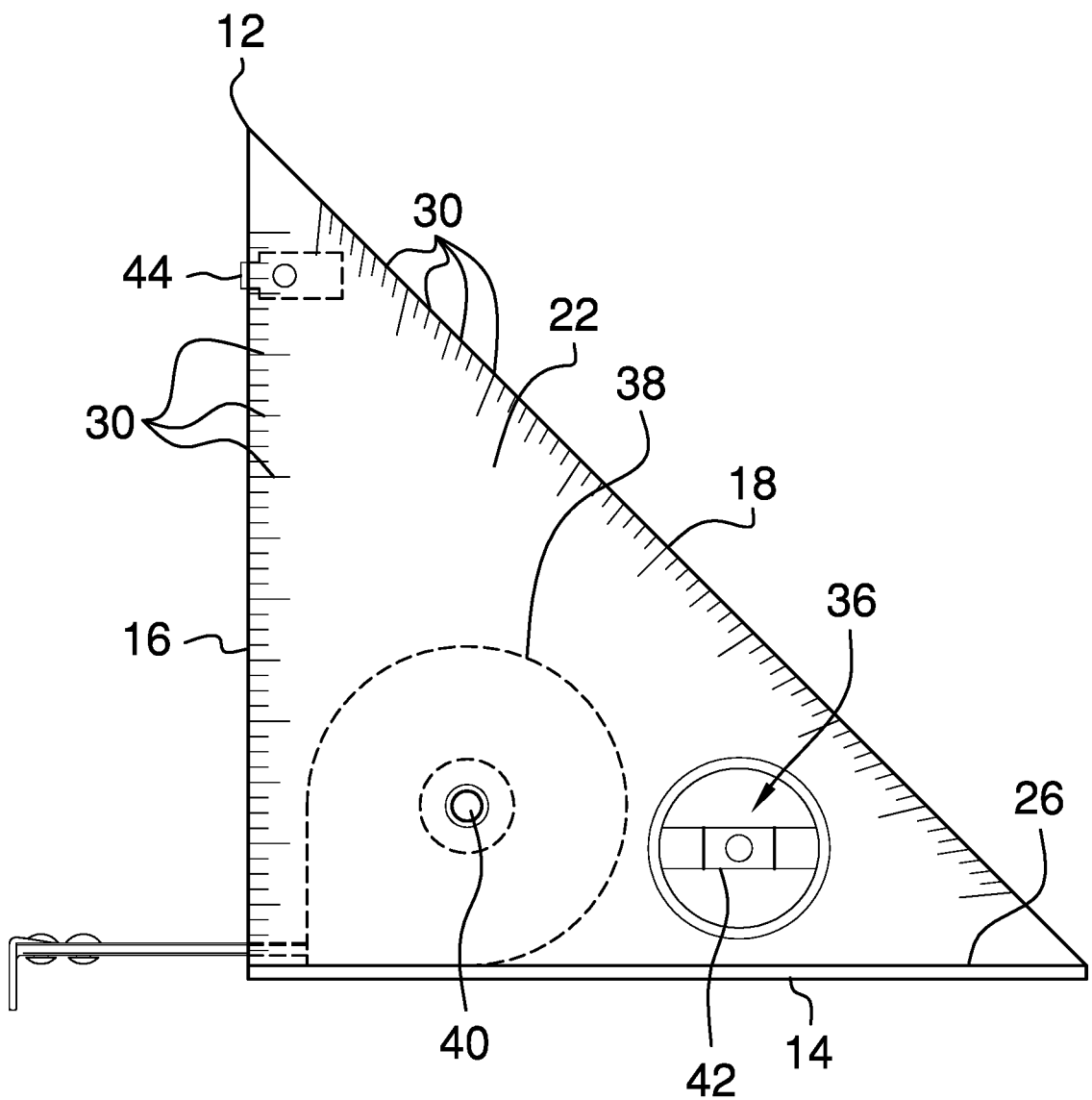
FIG. 3 is a left side phantom view of an embodiment of the disclosure.
Figure 4:
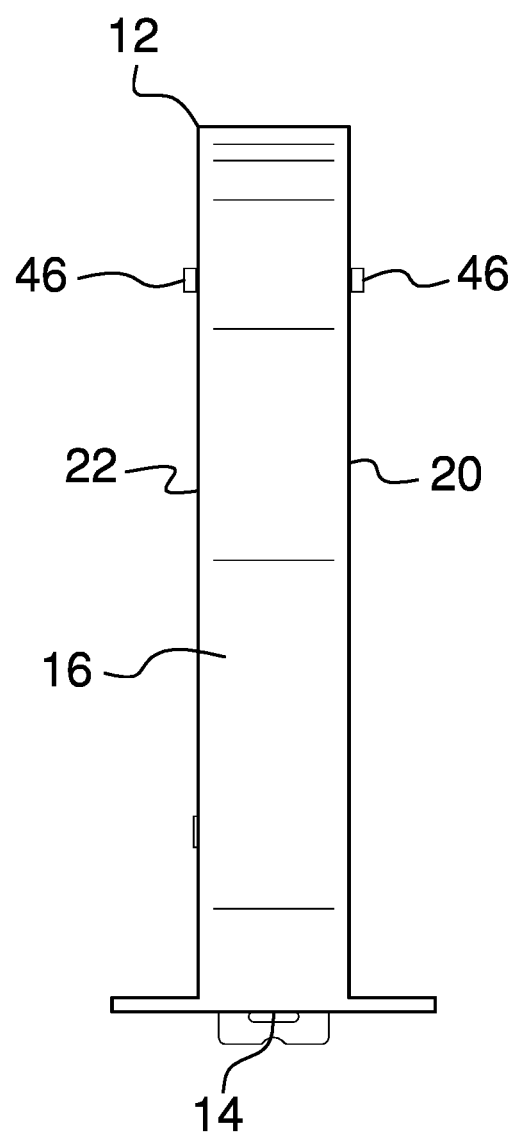
FIG. 4 is a back view of an embodiment of the disclosure.
Figure 5:
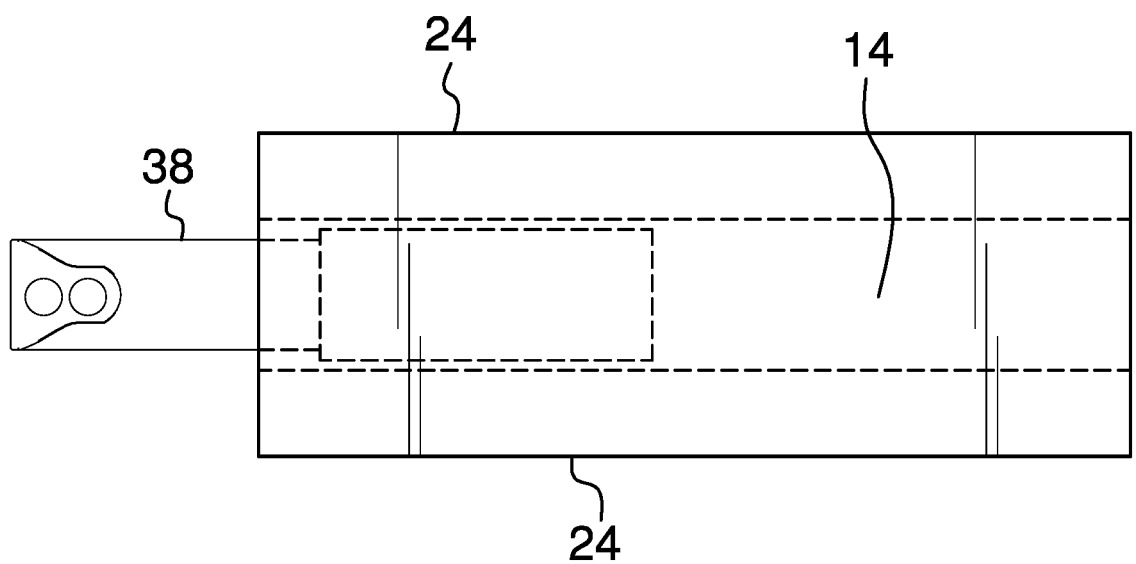
FIG. 5 is a bottom phantom view of an embodiment of the disclosure.

With reference now to the drawings, and in particular to FIGS. 1 through 5 thereof, a new combined tool embodying the principles and concepts of an embodiment of the disclosure and generally designated by the reference numeral 10 will be described.

As best illustrated in FIGS. 1 through 5, the combined square leveling 10 generally comprises a framer's square 12 for measuring angles during construction. The framer's square 12 has a basal side 14, a vertical side 16 and a hypotenuse side 18 extending between the basal side 14 and the vertical side 16. The framer's square 12 has a first lateral surface 20 and a second lateral surface 22, and the framer's square 12 has a pair of wings 24 each extending laterally away from a respective one of the first lateral surface 20 and the second lateral surface 22. Each of the wings 24 is oriented collinear with the basal side 14 and each of the wings 24 extending along a full length of the basal side 14.

Each of the wings 24 has a top surface 26 and the top surface 26 has measuring indicia 28 printed thereon comprising a graduated scale for measuring length. Each of the first lateral surface 20 and the second lateral surface 22 has measuring indicia 30 printed thereon that extends along each of the vertical side 16 and the hypotenuse side 18. The measuring indicia 30 on the first lateral surface 20 and the second lateral surface 22 comprise a graduated scale for measuring length.

The vertical side 16 has a measuring slot 32 extending into an interior of the framer's square 12 and the measuring slot 32 is aligned with the basal side 14. The vertical side 16 has a level slot 34 extending therein and the level slot 34 is positioned adjacent to the hypotenuse side 18. The level slot 34 is oriented to extend along a line that is oriented parallel to the basal side 14. The framer's square 12 has a hole 36 extending through the first lateral surface 20 and the second lateral surface 22.

A tape measure 38 is provided that is retractably positioned within the framer's square 12. The tape measure 38 is urgeable outwardly from the framer's square 12 for measuring distance. Moreover, the tape measure 38 extends outwardly through the measuring slot 32 in the vertical side 16 and the tape measure 38 is biased to retract into the framer's square 12. A lock 40 is provided that movably extends through the first lateral surface 20 of the framer's square 12. The lock 40 engages the tape measure 38 for inhibiting the tape measure 38 from retracting into the framer's square 12. Additionally, the lock 40 disengages the tape measure 38 when the lock 40 is depressed thereby facilitating the tape measure 38 to retract into the framer's square 12.

A bubble level 42 is coupled to the framer's square 12 to determine if a surface is level. The bubble level 42 is positioned in the hole 36 and the bubble level 42 is oriented to extend along a line is oriented parallel to the basal side 14 of the framer's square 12. A laser level 44 is slidably coupled to the framer's square 12 to emit a beam of light to establish a reference point on a distal object. The laser level 44 is slidably positioned in the level slot 34 in the vertical side 16 of the framer's square 12. A pair of adjustment screws 46 each extends through a respective one of the first lateral surface 20 and the second lateral surface 22 of the framer's square 12. Each of the adjustment screws 46 engages the laser level 44. The adjustment screws 46 adjust the position of the laser level 44 in the level slot 34 when the adjustment screws 46 are rotated. The laser level 44 may include a power button and a power supply, and the laser level 44 may comprise an LED or other similar type of light emitter with sufficient output intensity to shoot a beam of light a distance of at least 15.0 meters.

In use, the framer's square 12 is employed for measuring angles during construction. The tape measure 38 can be drawn outwardly from the framer's square 12 for measuring distance. The bubble level 42 can be employed to determine the level of a surface upon which the basal side 14 of the framer's square 12 is positioned. The laser level 44 is employed to emit a laser beam for determining a reference point on a distal surface with respect to the framer's square 12. In this way angle measurement, distance measurement, level measurement and laser leveling can be accomplished with a single device.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A combined square leveling assembly for measuring distance, angles and level, said assembly comprising:
   a framer's square for measuring angles during construction;
   a tape measure being retractably positioned within said framer's square, said tape measure being urgeable outwardly from said framer's square for measuring distance, said tape measure being biased to retract into said framer's square;
   a bubble level being coupled to said framer's square wherein said bubble level is configured to determine if a surface is level;
   a laser level being slidably coupled to said framer's square wherein said laser level is configured to emit a beam of light to establish a reference point on a distal object;
   wherein said framer's square has a basal side, a vertical side and a hypotenuse side extending between said basal side and said vertical side, said framer's square having a first lateral surface and a second lateral surface, said framer's square having a pair of wings each extending laterally away from a respective one of said first lateral surface and said second lateral surface, each of said wings being oriented collinear with said basal side, each of said wings extending along a full length of said basal side, wherein said vertical side has a level slot extending therein, said level slot being positioned adjacent to said hypotenuse side, said level slot being oriented to extend along a line being oriented parallel to said basal side, said framer's square having a hole extending through said first lateral surface and said second lateral surface;
   wherein said laser level is slidably positioned in said level slot in said vertical side of said framer's square; and
   a pair of adjustment screws, each of said adjustment screws extending through a respective one of said first lateral surface and said second lateral surface of said framer's square, each of said adjustment screws engaging said laser level, said adjustment screws adjusting the position of said laser level in said level slot when said adjustment screws are rotated.

2. The assembly according to claim 1, wherein each of said wings has a top surface, said top surface having measuring indicia being printed thereon comprising a graduated scale for measuring length, each of said first lateral surface and said second lateral surface having measuring indicia being printed thereon and extending along each of said vertical side and said hypotenuse side comprising a graduated scale for measuring length.

3. The assembly according to claim 1, wherein said vertical side has a measuring slot extending into an interior of said framer's square, said measuring slot being aligned with said basal side.

4. The assembly according to claim 3, wherein said tape measure extends outwardly through said measuring slot in said vertical side.

5. The assembly according to claim 1, further comprising a lock movably extending through said first lateral surface of said framer's square, said lock engaging said tape measure for inhibiting said tape measure from retracting into said framer's square, said lock disengaging said tape measure when said lock is depressed thereby facilitating said tape measure to retract into said framer's square.

6. The assembly according to claim 1, wherein said bubble level is positioned in said hole, said bubble level being oriented to extend along a line being oriented parallel to said basal side of said framer's square.

7. A combined square leveling assembly for measuring distance, angles and level, said assembly comprising:
   a framer's square for measuring angles during construction, said framer's square having a basal side, a vertical side and a hypotenuse side extending between said basal side and said vertical side, said framer's square having a first lateral surface and a second lateral surface, said framer's square having a pair of wings each extending laterally away from a respective one of said first lateral surface and said second lateral surface, each of said wings being oriented collinear with said basal side, each of said wings extending along a full length of said basal side, each of said wings having a top surface, said top surface having measuring indicia being printed thereon comprising a graduated scale for measuring length, each of said first lateral surface and said second lateral surface having measuring indicia being printed thereon and extending along each of said vertical side and said hypotenuse side comprising a graduated scale for measuring length, said vertical side having a measuring slot extending into an interior of said framer's square, said measuring slot being aligned with said basal side, said vertical side having a level slot extending therein, said level slot being positioned adjacent to said hypotenuse side, said level slot being oriented to extend along a line being oriented parallel to said basal side, said framer's square having a hole extending through said first lateral surface and said second lateral surface;

a tape measure being retractably positioned within said framer's square, said tape measure being urgeable outwardly from said framer's square for measuring distance, said tape measure extending outwardly through said measuring slot in said vertical side, said tape measure being biased to retract into said framer's square;

a lock movably extending through said first lateral surface of said framer's square, said lock engaging said tape measure for inhibiting said tape measure from retracting into said framer's square, said lock disengaging said tape measure when said lock is depressed thereby facilitating said tape measure to retract into said framer's square;

a bubble level being coupled to said framer's square wherein said bubble level is configured to determine is a surface is level, said bubble level being positioned in said hole, said bubble level being oriented to extend along a line being oriented parallel to said basal side of said framer's square;

a laser level being slidably coupled to said framer's square wherein said laser level is configured to emit a beam of light to establish a reference point on a distal object, said laser level being slidably positioned in said level slot in said vertical side of said framer's square; and a pair of adjustment screws, each of said adjustment screws extending through a respective one of said first lateral surface and said second lateral surface of said framer's square, each of said adjustment screws engaging said laser level, said adjustment screws adjusting the position of said laser level in said level slot when said adjustment screws are rotated.

* * * * *